Feb. 27, 1934.  A. F. CLINE  1,949,355
MOISTURE CUP HEAT CONTROL APPARATUS FOR CREAMERIES
Filed May 3, 1932
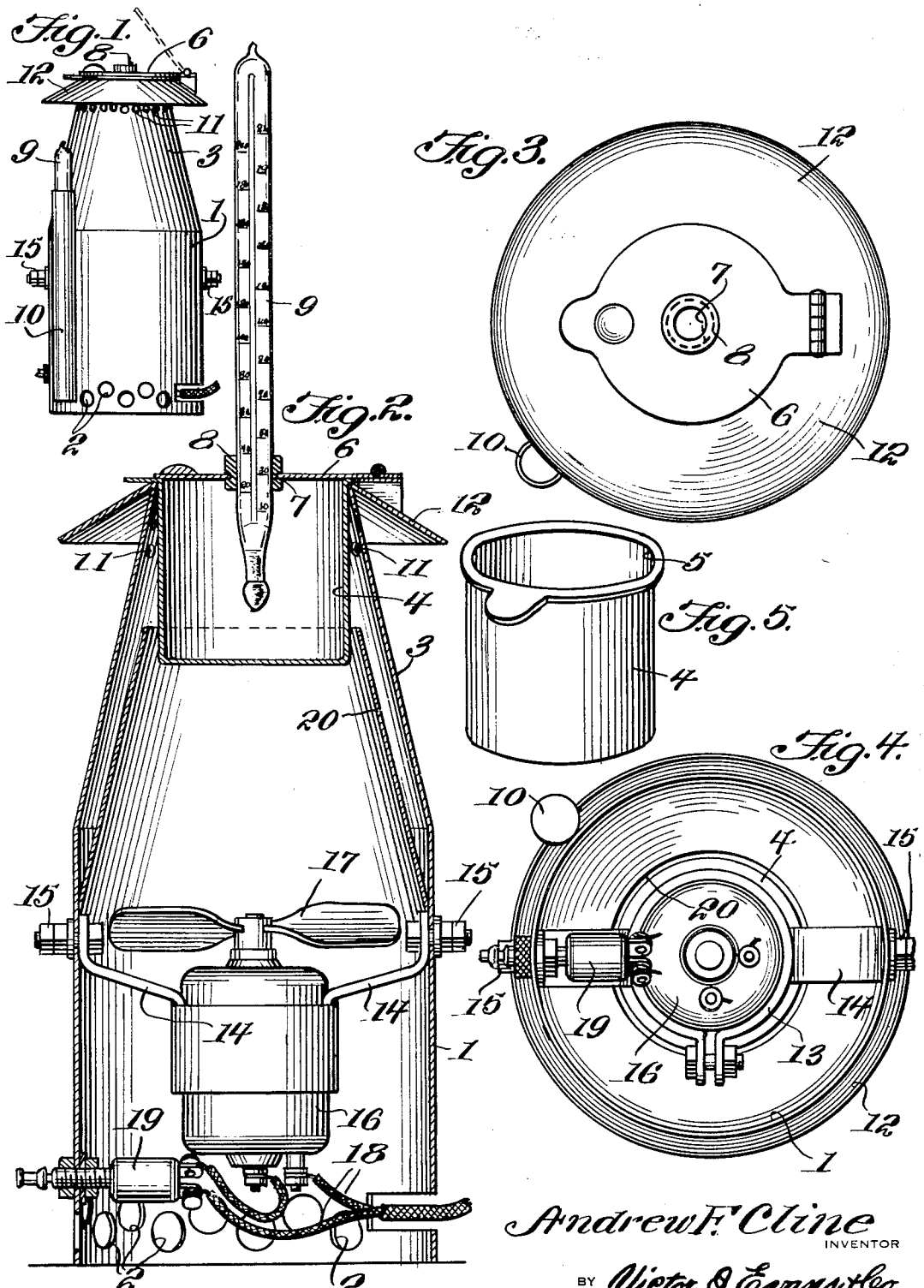

Patented Feb. 27, 1934

1,949,355

UNITED STATES PATENT OFFICE 1,949,355

MOISTURE CUP HEAT CONTROL APPARATUS FOR CREAMERIES

Andrew F. Cline, Hayward, Wis.

Application May 3, 1932. Serial No. 608,973

3 Claims. (Cl. 23—258)

This invention relates to apparatuses especially adapted for use when making tests of butter to determine the moisture and salt content thereof and has for the primary object, the provision of a device of the above stated character, whereby a test or moisture cup may be easily and quickly lowered in temperature and means to permit the operator to readily determine when the cup is at the desired temperature.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating an apparatus for cooling test cups constructed in accordance with my invention.

Figure 2 is a vertical sectional view illustrating the same.

Figure 3 is a top plan view illustrating the same.

Figure 4 is a bottom plan view illustrating the device.

Figure 5 is a perspective view illustrating a test cup.

Referring in detail to the drawing, the numeral 1 indicates a substantially cylindrical casing having its lower end provided with a series of perforations or openings 2 for admitting air to the interior of the casing while resting upon a support. The upper portion of the casing is tapered as shown at 3 and provided with a receiving opening in which may be positioned a test cup 4, the latter being provided with a marginal flange 5 to rest upon the upper end of the casing with the cup depending downwardly within the tapered portion of said casing. The upper end of the casing carries a hinge cover 6 adapted to overlie and completely close the test cup during the use of the device and is provided with a centrally arranged opening 7 in which is positioned a gasket 8 to receive and frictionally engage a thermometer 9 whereby the temperature of the contents of the cup or the interior of the cup may be readily determined. The thermometer 9 is removable from the opening 7 and may be supported in a tubular rack 10 formed on one side of the casing as shown in Figure 1. The casing 1 adjacent the receiving opening for the test cup is provided with a series of perforations or openings 11 to permit air forced upwardly through the casing about the cup to escape from said casing. A downwardly and outwardly extending flange 12 is formed on the casing at the receiving opening to overlie the perforations or apertures 11 so that the air driven from the casing will be deflected downwardly and outwardly from the casing.

A bracket 13 is supported in the lower portion of the casing 1 and in spaced relation to the walls by arms 14 formed integrally with the bracket and detachably secured to opposite walls of the casing by fasteners 15. The bracket 13 supports a suitable electric motor 16 provided with a fan 17. The motor 16 is furnished with electricity by electrical conductors 18 controlled by a switch 19 that extends exteriorly of the casing so that the operation of the motor may be stopped and started when desired.

An upwardly tapering sleeve 20 is mounted in the casing 1 directly above the fan 17 so that the air expelled by the fan in an upward direction will be driven about the walls of the cup and outwardly of the casing by way of the apertures or openings 11 so that the cup and its contents may be lowered to a desired temperature, the thermometer permitting the operator to readily determine when the desired temperature is reached.

The foregoing described apparatus is especially adapted for use in connection with the following method employed in determining the moisture and salt content of butter.

The cup 4 is first thoroughly dried by being subjected to heat consequently raising the temperature of the cup above a temperature for the successful operation of testing the moisture and salt content of butter which should be around 100° F. The heating of the cup is for the purpose of removing all moisture therefrom. After the heating of the cup it is weighed. A desired amount of butter is then placed in the cup and subjected to heat for the purpose of evaporating moisture from the butter which raises the temperature of the cup and after the evaporation of the moisture, the cup with contents is placed within the apparatus and the lid 6 moved into a closed position. The electric motor is started forcing air about the cup to lower the temperature thereof to 100° F. The butter is then weighed to determine the moisture and after the moisture test has been completed, the butter is washed or bathed in gasoline one or more times to cut or separate the fat from the salt and curd. The curd and salt are dried by being subjected to heat until they turn a brownish or sand color whence they are placed again into the apparatus and the motor again started to reduce the temperature thereof to 100° F., thus permitting the operator to readily determine the salt content. By employing the apparatus it is possible to easily lower the temperature of the test cup and at the same time permit the operator to readily determine when the cup reaches a desired or proper temperature obviating the customary practice of the operator placing the cup against the hand or cheek to determine the approximate temperature thereof and which at the best is only guess work.

In actual practice the moisture within the cup varies from 1 to 1.2% and with this apparatus it is possible to readily control the temperature of the cup and maintain the same at a desired temperature both before and after the test which means a saving in butter fat.

When manufacturing the apparatus different types of electric motors may be employed, for instance, an electric motor capable of operation from a battery source may be employed or an electric motor may be employed operable from house current.

While I have shown and described the preferred embodiment of my invention, it will be understood that minor changes in construction, combination and arrangement of parts may be made without departing from the spirit and scope of my invention, as claimed.

Having thus described my invention, what I claim is:

1. An apparatus of the character described comprising a casing having an opening to permit a test cup to be positioned within said casing, a closure carried by the casing for closing the test cup, a temperature determining means carried by the closure and extending into the cup, and means in said casing for forcing air therethrough and about the cup to cool the cup to a desired temperature.

2. An apparatus of the character described comprising a casing having an opening, a test cup extending into the casing by way of said opening, said casing having a series of apertures adjacent the cup, a manually controlled and electrically actuated means for forcing air through the casing about the cup and outwardly from said casing by way of the apertures to cool the cup and its contents to a desired temperature, a downwardly extending flange on the casing and overlying the apertures to direct the air escaping from said casing outwardly and downwardly from the casing, and a hinge cover carried by said casing for closing the cup.

3. An apparatus of the character described comprising a casing having an opening, a test cup depending into the casing by way of said opening, said casing having a series of apertures adjacent the cup, a manually controlled and electrically actuated means for forcing air through the casing about the cup and outwardly from said casing by way of the apertures to cool the cup and its contents to a desired temperature, a downwardly extending flange on the casing and overlying the apertures to direct the air escaping from said casing outwardly and downwardly from the casing, a hinge cover carried by said casing for closing the cup, and means carried by said cover to removably receive a thermometer for permitting said thermometer to be extended into the cup.

ANDREW F. CLINE.